March 11, 1969  A. F. BISSETT  3,432,708
REMOVABLE BRUSH ASSEMBLY
Filed Oct. 19, 1966
FIG.4
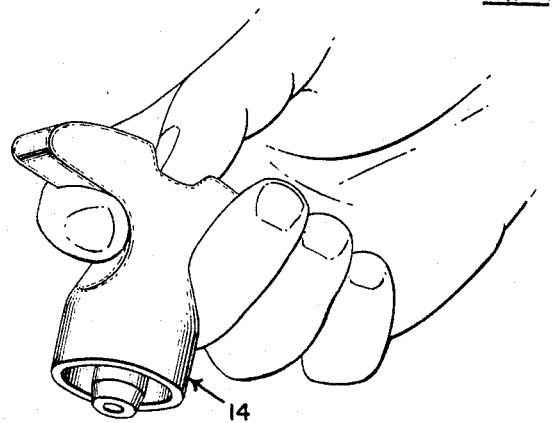
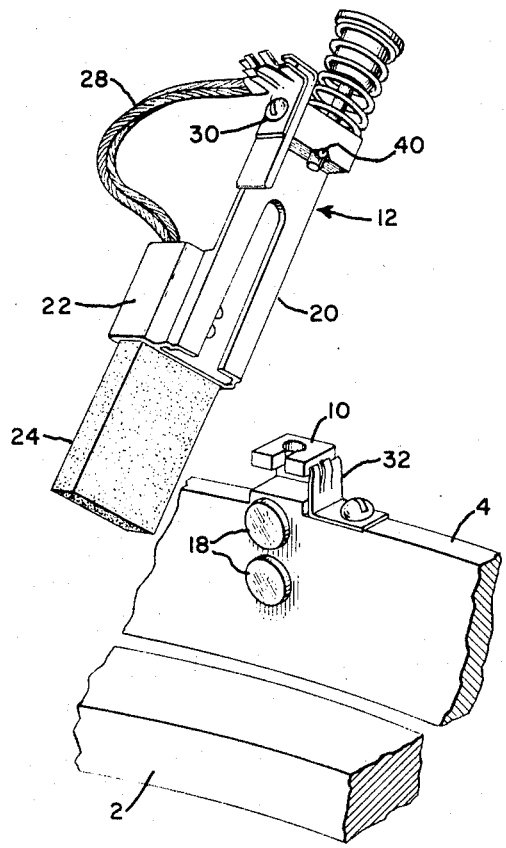
INVENTOR:
ALEXANDER F. BISSETT,
BY *Robert J. Bird*
HIS ATTORNEY.

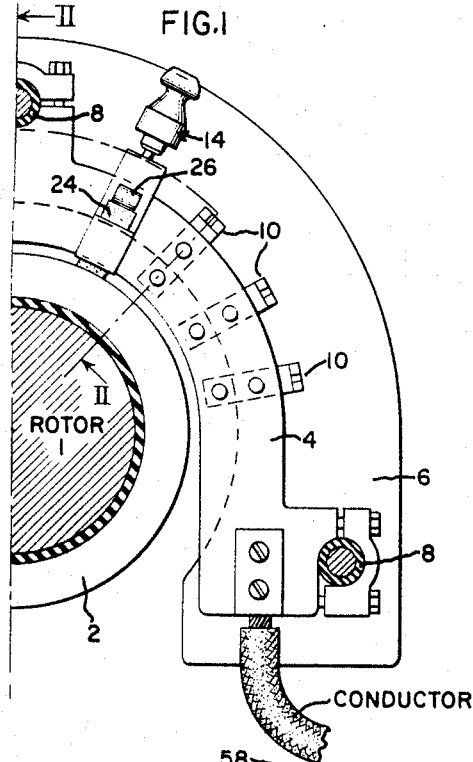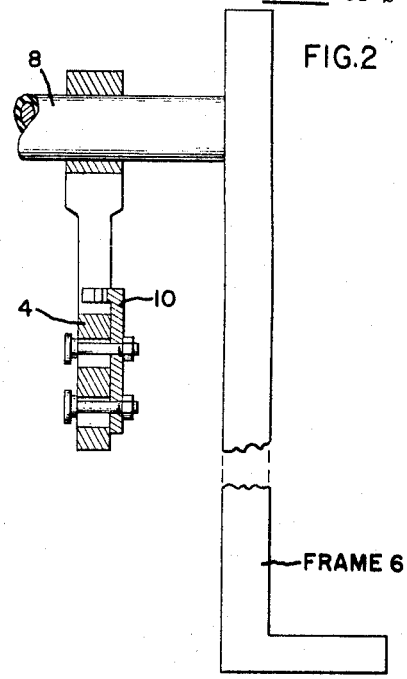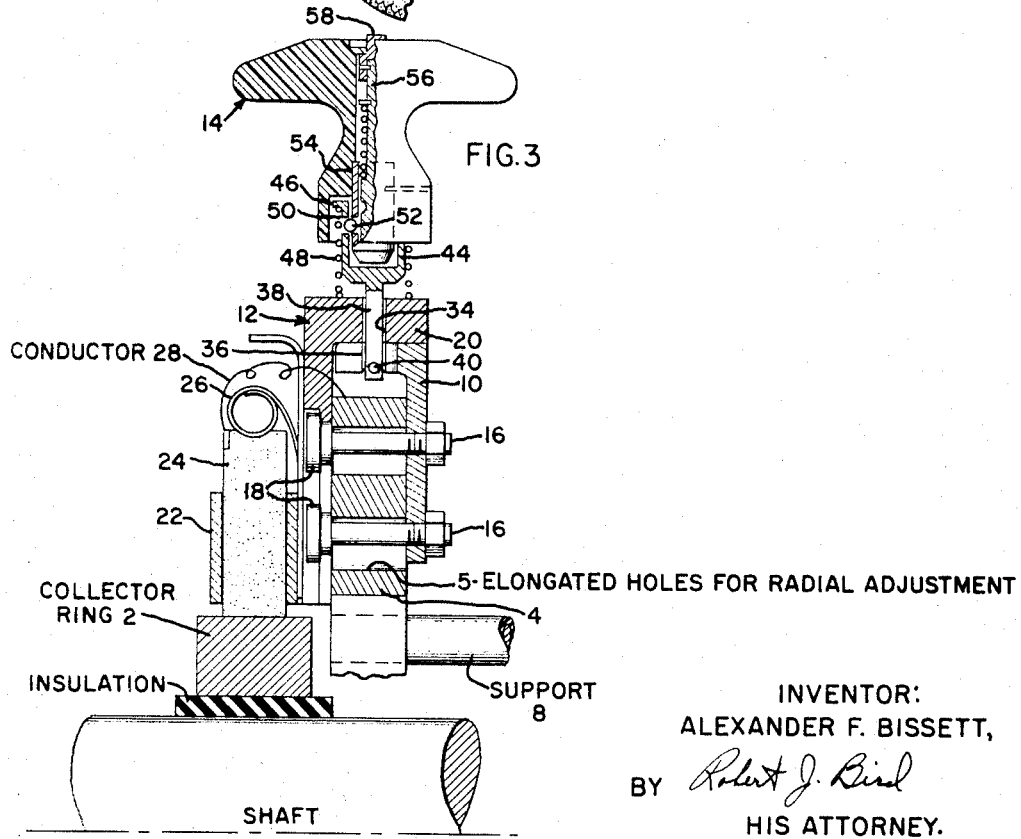

United States Patent Office 3,432,708
Patented Mar. 11, 1969

3,432,708
REMOVABLE BRUSH ASSEMBLY
Alexander F. Bissett, Lynn, Mass., assignor to General Electric Company, a corporation of New York
Filed Oct. 19, 1966, Ser. No. 587,851
U.S. Cl. 310—239
Int. Cl. H02k 5/14
2 Claims This invention relates to a dynamoelectric machine brush assembly. More particularly, it relates to a removable brush arrangement whereby a collector brush can be installed and removed from a dynamoelectric machine while the machine is running.

In collector brush assemblies generally known to the prior art, the manipulation required to replace a brush are sometimes rather involved, usually calling for the shutdown of the generator. It would be desirable if generator brushes were replaceable during operation without shutting down the machine while at the same time affording complete safety to an operator performing the replacement.

Therefore, it is an object of the present invention to provide a dynamoelectric machine brush holder which is simply and safety removable during operation of the machine.

Another object is to provide a brush holder having a removable handle; the handle being used to service an indefinite number of brushes.

Other objects, advantages and features of the present invention will become apparent from the following description of one embodiment thereof, when taken in connection with the accompanying drawing.

Briefly stated, the present invention is practiced in one form by a brush assembly which is removable from a dynamoelectric machine brush frame. Each brush assembly is installable and removable by an insulated handle which is itself removable from each brush assembly so that only one such handle is required to service an entire generator.

In the drawing:
FIG. 1 is a front view of a general arrangement of a generator shaft and associated brushes incorporating the present invention,
FIG. 2 is a sectional view taken along the line II—II of FIG. 1, and
FIG. 3 is an enlarged sectional view of the brush assembly shown in FIG. 2.
FIG. 4 is an exploded view showing the three major elements of the invention in a disassembled relationship.

Referring now to FIGS. 1 and 2, there is shown the collector ring 2 of a generator rotor 1 rotatably mounted relative to a brush frame 4 which itself is mounted to a frame means 6 and insulated therefrom by insulated supports 8. A plurality of brush support backplates 10 is disposed circumferentially around brush frame 4 and around rotor collecting ring 2. Mounted on each backplate 10 is a brush assembly generally indicated at 12 with a removable handle generally indicated at 14, only one of which is shown in FIG. 1.

Referring now to FIG. 3, a brush assembly backplate 10 is shown bolted by bolts 16 to the brush frame 4. Frame 4 defines holes 5 therethrough for the accommodation of bolts 16, which holes 5 are elongated for radial adjustment of backplate 10 relative to frame 4. Bolts 16 have heads 18 modified in the form of dovetails.

Still referring to FIG. 3, the brush assembly generally indicated at 12 comprises an L-shaped member 20, the long side of which is bifurcated and modified with suitable shoulders so as to slide into a securely held position relative to dovetails 18. This is also shown in the exploded view of FIG. 4. L-shaped member 20 has a brush holder 22 mounted at its end as shown, which brush holder is in the form of a hollow rectangular member open at both ends for the accommodation therein of a carbon brush 24. A spring member 26 is also mounted relative to L-shaped member 20 and urges the carbon brush 24 in a direction as to positively contact the collector ring 2. Carbon brush 24 is electrically connected to the brush assembly 12 by means of its contact with brush holder 22 and, in addition, by means of a conductor 28 leading from the brush to the brush assembly 12. Conductor 28 terminates at the brush assembly in a knife-edge clip 30. Knife-edge clip 30 is adapted for insertion between the leads of a spring lead receptacle 32 which is fastened to the brush frame 4.

L-shaped member 20 has a hole 34 therethrough which is in registry with a hole 36 extending through the brush assembly backplate 10. A spindle 38 having a crosspiece 40 on its end portion passes through holes 34 and 36, the crosspiece 40 being accommodated in hole 36 by the fact that hole 36 is elongated in one direction. In the other direction, 90 degrees rotated from the first, a pair of V-notches accommodates the crosspiece 40. Spindle 38 is attached at the end of, and coaxial with, a cylindrical member 44 which has a flange 46 on its opposite end. A helical compression spring 48 surrounds cylindrical member 44 and extends between the flange 46 and the L-shaped member 20, urging member 20 and backplate 10 together.

Cylindrical member 44 is detachably fastened to handle 14. Member 44 has two transverse holes 50 extending in a radial direction therethrough. Handle 14 has a pair of ball members 52 moveably contained and which are extendable in a radial direction so as to be partially insertable in holes 50. Balls 52 are actuable by a detent mechanism which comprises a cylindrical sleeve 54 surrounding a spindle 56 which is actuable in turn by a button 58, all of which members are a part of the insulated handle 14. The details of the detent mechanism which releases balls 52 should be apparent from the drawing. The essential thing with regard to the handle 14 is that it is removable from the spindle 38, but that it will rotate the spindle when engaged therewith.

In use, when it is desired to remove a worn generator brush, first the handle 14 is inserted within cylindrical member 44 by pressing button 58 which allows balls 52 to retract within the sleeve 54. When the handle 14 is positioned relative to cylinder 44, the button 58 is released and balls 52 are forced radially into holes 50 so as to interfere and prevent relative motion between cylinders 54 and 44. Next, handle 14, along with cylindrical member 44 and spindle 38, is depressed so that crossmember 40 is removed from its restraining V-notches. The handle is then rotated 90° so that crossmember 40 is aligned with the elongated portion of hole 36. Spring 48 is then relaxed so that crossmember 40 is raised into abutting relationship with L-shaped member 20. An upward pull on handle 14 then removes L-shaped member 20 and its associated brush holder 22 with brush 24 from the brush assembly backplate 10. A press on the button 58 will again allow balls 52 to retract and handle 14 can be removed from cylindrical member 44.

FIG. 4 shows the brush assembly 12 disconnected from its backplate 10, and handle 14 disconnected from brush assembly 12. Handle 14 is of course able to perform the same service on each and every brush assembly on the generator.

It will be appreciated that a removable brush assembly and a removable handle have been described herein which will enable an operator to easily and economically perform brush maintenance operations while the machine is in operation.

It may occur to others of ordinary skill in the art to make modifications of the present invention which will remain within the concept and scope thereof and not constitute a departure therefrom. Accordingly, it is intended that the invention be not limited by the details in which it has been described but that it encompass all within the purview of the following claims:

What is cleaimed is:

1. A dynamoelectric machine brush mounting device including:
   a stationary backplate mounted in a fixed position relative to said machine,
   a brush assembly removably fitted to said backplate, and a handle,
   said backplate and said brush assembly being dovetailed to each other for insertion and removal in a first direction, said backplate and said brush assembly defining holes in said first direction which holes are in a registry when said brush assembly is dovetailed to said backplate, the hole in said backplate being elongated,
   a spindle member having a crosspiece at one end thereof, said crosspiece being shorter than the largest dimension of the hole in said backplate and longer than the smallest dimension of the hole in said backplate,
   a flanged hollow cylinder mounted on the other end of said spindle,
   a compression spring extending between said flange and said brush assembly,
   said handle removably fixed relative to said hollow cylinder.

2. A dynamoelectric machine brush mounting device according to claim 1, in which:
   said hollow cylinder defines transverse holes and said handle contains balls transversely movable into said holes to prevent relative movement between said handle and said cylinder, said balls being manually actuable.

References Cited

UNITED STATES PATENTS

| | | | |
|---|---|---|---|
| 3,387,155 | 6/1968 | Krulls | 310—240 |
| 1,465,709 | 8/1923 | Chandeysson | 310—239 |

MILTON O. HIRSHFIELD, *Primary Examiner.*

M. O. BUDD, *Assistant Examiner.*